United States Patent
Park et al.

(10) Patent No.: US 9,830,120 B2
(45) Date of Patent: Nov. 28, 2017

(54) METHODS AND DEVICES FOR PROCESSING IMAGES

(71) Applicant: Samsung Electronics Co., Ltd., Gyeonggi-do (KR)

(72) Inventors: Seongha Park, Gyeonggi-do (KR); Kihuk Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/722,399

(22) Filed: May 27, 2015

(65) Prior Publication Data

US 2015/0347074 A1 Dec. 3, 2015

(30) Foreign Application Priority Data

May 28, 2014 (KR) ........................ 10-2014-0064491

(51) Int. Cl.
*H04N 5/45* (2011.01)
*G06F 3/14* (2006.01)
(Continued)

(52) U.S. Cl.
CPC ............. *G06F 3/14* (2013.01); *G02B 27/017* (2013.01); *H04N 5/7491* (2013.01);
(Continued)

(58) Field of Classification Search
CPC ........ H04N 5/45; H04N 5/772; H04N 5/7491; H04N 5/225; H04N 13/0429; H04N 13/044; H04N 13/0022; H04N 13/0292; H04N 13/0456; H04N 13/0438; H04N 21/4223; H04N 21/4316; H04N 21/440263; G02B 27/0172; G02B 27/017; G02B 27/2264; G02B 26/10; G09G 3/0022; G09G 3/3611; G09G 2340/0407; G09G 2340/0464; G09G 2340/12; G06F 3/14

USPC .... 348/565, 569, 581, 648, 421.1, 373, 345, 348/274, 207.99, 168, 142, 140, 137, 115, 348/94, 78, 73, 64, 49, 50, 38, 43, 47, 348/207; 345/7, 8, 9, 156, 419, 690, 633; 375/240.21; 382/154

See application file for complete search history.

(56) References Cited

U.S. PATENT DOCUMENTS 5,596,433 A * 1/1997 Konuma ............ G02B 27/0172
359/630
5,671,019 A * 9/1997 Isoe .................... H04N 5/44513
348/468

(Continued)

FOREIGN PATENT DOCUMENTS

JP 2007-193254 A 8/2007

*Primary Examiner* — Jefferey F Harold
*Assistant Examiner* — Mustafizur Rahman
(74) *Attorney, Agent, or Firm* — Cha & Reiter, LLC.

(57) ABSTRACT

Methods and devices for processing images are disclosed. In various embodiments, an electronic device for processing images may include: a display module to display a first image and a control module to control a process of receiving a second image different from the first image. The control module may be capable of altering the second image in accordance with a block area arranged on the first image, determining an output sequence for the first image and the altered second image, and alternatingly displaying the first image and the altered second image according to the output sequence.

18 Claims, 13 Drawing Sheets

(51) Int. Cl.
*G02B 27/01* (2006.01)
*H04N 21/4223* (2011.01)
*H04N 21/431* (2011.01)
*H04N 21/4402* (2011.01)
*H04N 5/74* (2006.01)
*G09G 5/36* (2006.01)

(52) U.S. Cl.
CPC ..... *H04N 21/4223* (2013.01); *H04N 21/4316* (2013.01); *H04N 21/440263* (2013.01); *G02B 2027/0138* (2013.01); *G02B 2027/0178* (2013.01); *G09G 5/36* (2013.01); *G09G 2340/0407* (2013.01); *G09G 2340/0464* (2013.01); *G09G 2340/12* (2013.01); *H04N 5/45* (2013.01)

(56) References Cited

U.S. PATENT DOCUMENTS

| | | | | |
|---|---|---|---|---|
| 5,818,541 | A * | 10/1998 | Matsuura | H04N 5/45 348/565 |
| 6,445,365 | B1 * | 9/2002 | Taniguchi | G02B 27/017 345/3.1 |
| 6,507,359 | B1 * | 1/2003 | Muramoto | H04N 5/772 345/8 |
| 7,061,544 | B1 * | 6/2006 | Nonomura | H04N 5/44543 348/465 |
| 8,217,856 | B1 * | 7/2012 | Petrou | G02B 27/017 345/8 |
| 8,482,527 | B1 * | 7/2013 | Kim | G06F 3/011 345/168 |
| 8,957,835 | B2 | 2/2015 | Hoellwarth | 345/8 |
| 8,977,205 | B2 * | 3/2015 | Tricoukes | H04R 1/1008 345/8 |
| 2002/0075407 | A1 * | 6/2002 | Cohen-Solal | H04N 5/45 348/565 |
| 2005/0174470 | A1 * | 8/2005 | Yamasaki | G02B 27/017 348/345 |
| 2007/0069977 | A1 * | 3/2007 | Adderton | A63B 24/0003 345/8 |
| 2007/0217517 | A1 * | 9/2007 | Heyward | H04N 5/145 375/240.21 |
| 2008/0074550 | A1 * | 3/2008 | Park | H04N 5/445 348/565 |
| 2008/0266386 | A1 * | 10/2008 | Maeda | G06F 3/012 348/47 |
| 2009/0027772 | A1 * | 1/2009 | Robinson | H04N 13/044 359/472 |
| 2010/0079356 | A1 | 4/2010 | Hoellwarth | |
| 2010/0103318 | A1 * | 4/2010 | Wang | H04N 5/45 348/565 |
| 2010/0259471 | A1 * | 10/2010 | Takano | G02B 27/017 345/156 |
| 2011/0157160 | A1 * | 6/2011 | Ushiki | H04N 13/0275 345/419 |
| 2011/0194029 | A1 * | 8/2011 | Herrmann | G02B 27/017 348/569 |
| 2011/0199402 | A1 * | 8/2011 | Ishii | G09G 3/002 345/690 |
| 2011/0267433 | A1 * | 11/2011 | Thorpe | G03B 35/08 348/47 |
| 2011/0316972 | A1 * | 12/2011 | Demas | H04N 13/0003 348/43 |
| 2012/0026396 | A1 * | 2/2012 | Banavara | H04N 13/045 348/500 |
| 2012/0050141 | A1 * | 3/2012 | Border | G02B 27/017 345/8 |
| 2012/0050143 | A1 * | 3/2012 | Border | G09G 3/3611 345/8 |
| 2012/0081515 | A1 * | 4/2012 | Jang | H04N 5/45 348/43 |
| 2012/0113216 | A1 * | 5/2012 | Seen | H04N 5/23293 348/38 |
| 2012/0250152 | A1 * | 10/2012 | Larson | G02B 27/2264 359/464 |
| 2013/0135296 | A1 * | 5/2013 | Rha | H04N 13/0434 345/419 |
| 2013/0141476 | A1 * | 6/2013 | Wu | H04N 13/0418 345/690 |
| 2013/0155186 | A1 * | 6/2013 | Lee | H04N 13/0048 348/43 |
| 2013/0155325 | A1 * | 6/2013 | Ramamurthy | H04N 21/4316 348/565 |
| 2013/0194296 | A1 * | 8/2013 | Lee | H04N 13/0438 345/619 |
| 2013/0289875 | A1 * | 10/2013 | Kumon | G01C 21/365 701/533 |
| 2015/0023589 | A1 * | 1/2015 | Kataoka | G06T 15/20 382/154 |
| 2015/0061973 | A1 * | 3/2015 | Park | G02B 27/017 345/8 |
| 2015/0288944 | A1 * | 10/2015 | Nistico | H04N 13/0022 345/156 |
| 2016/0189429 | A1 * | 6/2016 | Mallinson | G02B 26/10 345/633 |

\* cited by examiner

FIG. 5A
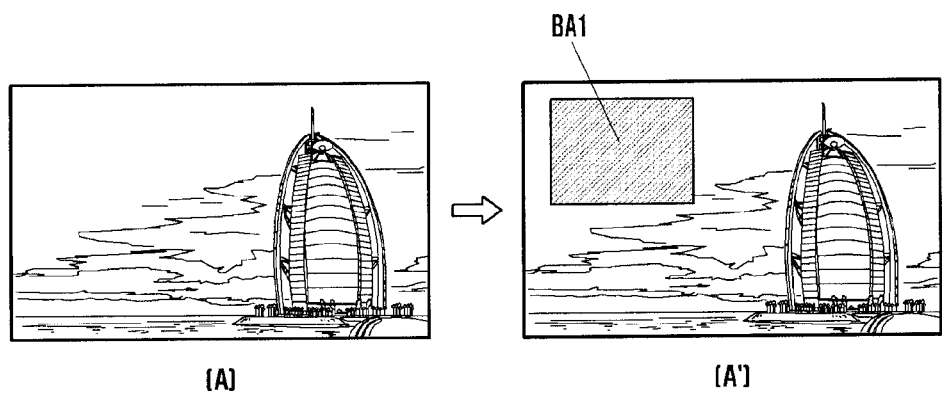
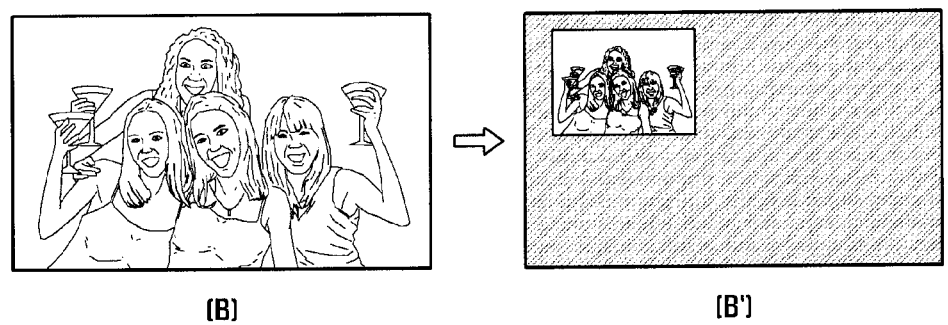

FIG. 5B
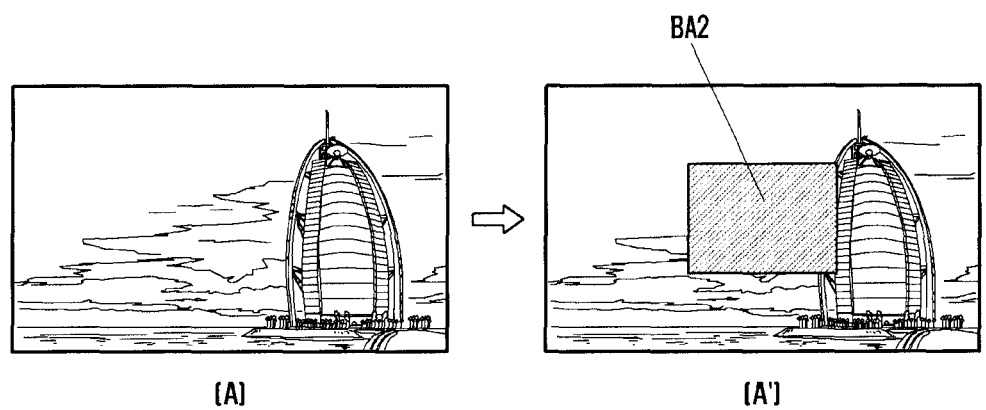
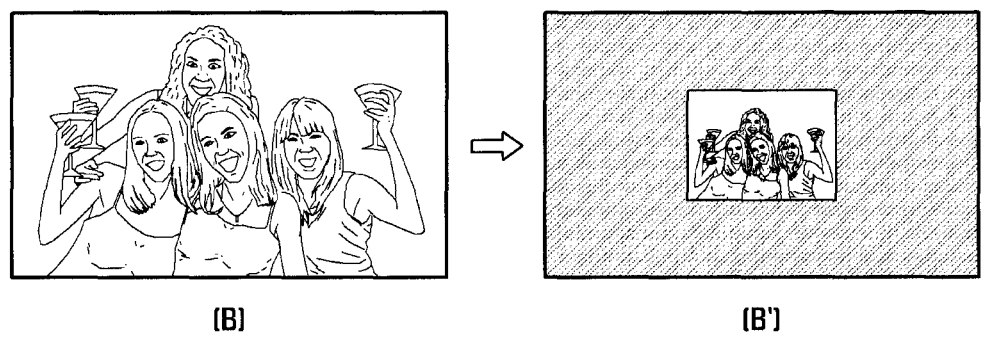

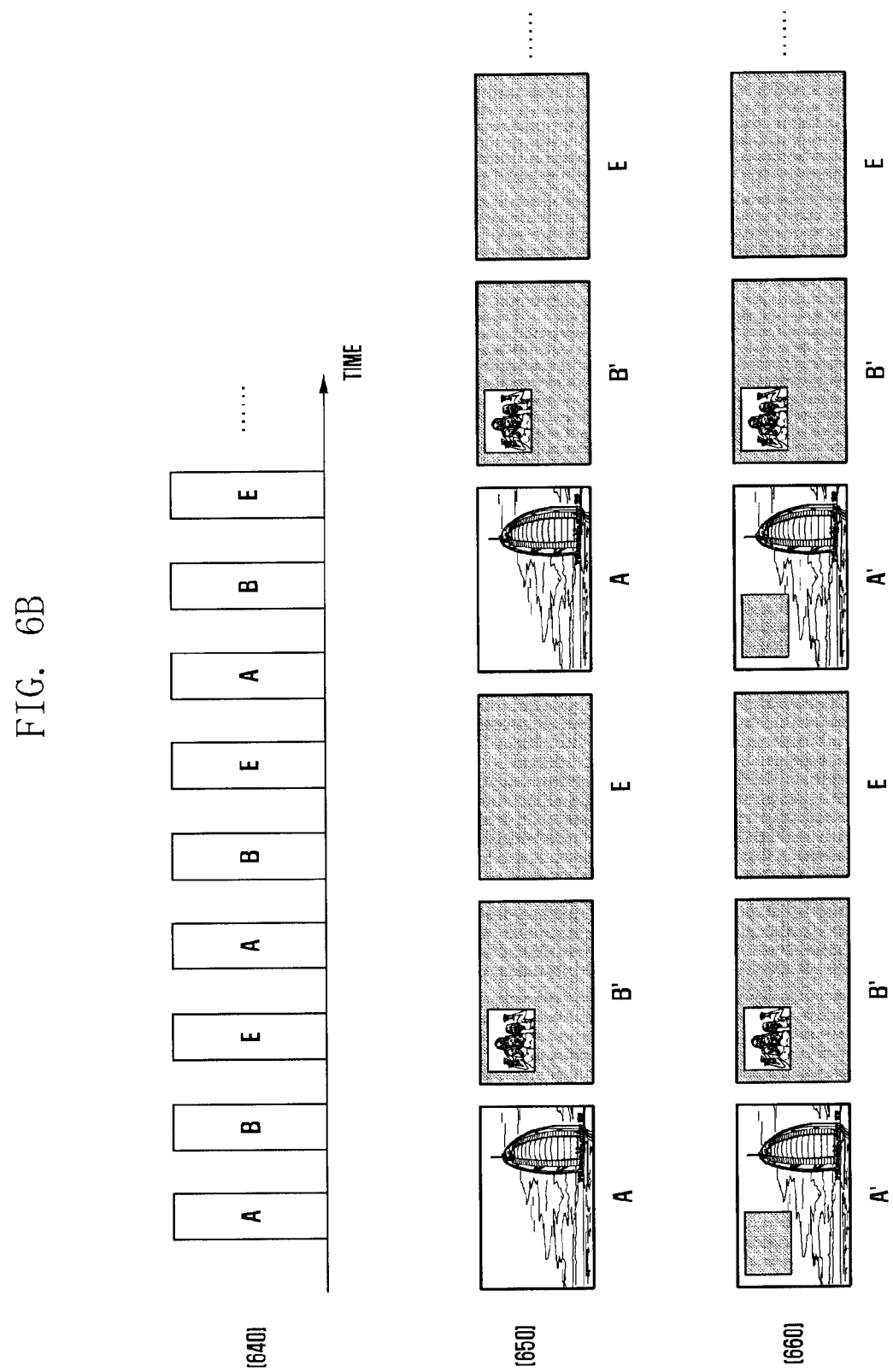

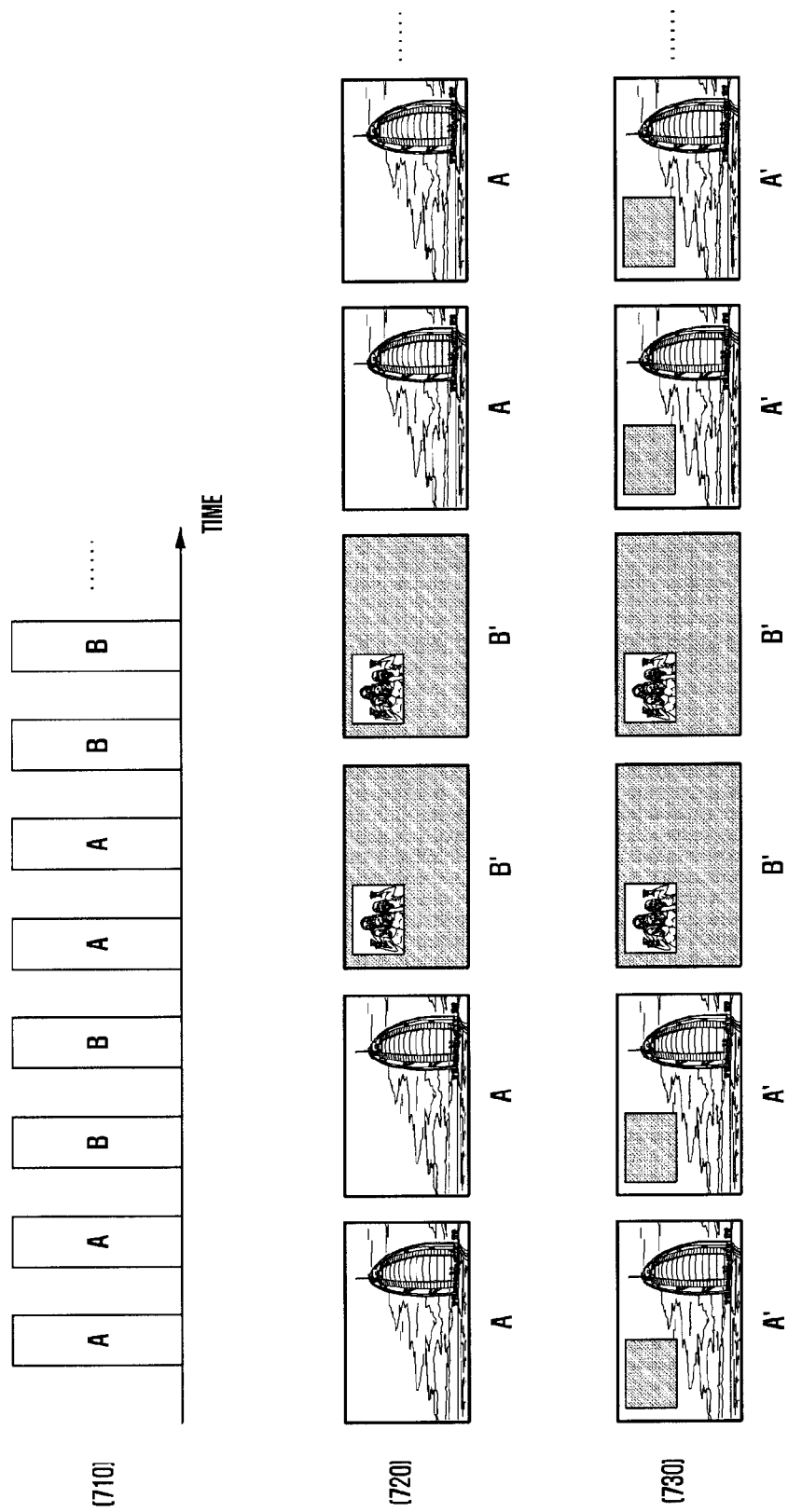

METHODS AND DEVICES FOR PROCESSING IMAGES

CLAIM OF PRIORITY

This application claims the benefit under 35 U.S.C. §119(a) of a Korean Patent Application filed on May 28, 2014 in the Korean Intellectual Property Office and assigned Serial No. 10-2014-0064491, the entire disclosure of which is hereby incorporated by reference.

TECHNICAL FIELD

The present disclosure relates to methods and devices for efficiently processing images.

BACKGROUND

With advances in various technologies, electronic devices such as mobile terminals may provide not only basic functions including voice calls and text messages but also various supplementary functions including document handling, video editing and wireless Internet access. For convenience, some electronic devices have evolved into wearable devices that can be attached to human bodies.

Wearable devices may include wrist-attached devices such as a wristwatch or bracelet and head-mounted devices such as glasses and head-mounted display (HMD). A head-mounted display may comprise an image display device that enables a user to enjoy video content with a large screen experience. Head-mounted displays may also be applied to medical instruments usable for diagnosis or surgery. The electronic device embedded in a head-mounted display may display a first image on a display unit and, when a second image is received simultaneously display the first and second image on the display unit.

A Picture-in-Picture (PIP) feature is often used to simultaneously display two images, where a smaller image is superimposed in a small box form on a larger image. To realize superimposed images, a separate storage space is typically needed to store two original images and a PIP image produced therefrom. In addition, a combiner unit is conventionally used to combine the two original images in consideration of a desired position and size. Thus, a PIP feature typically utilizes device resources such as storage space, processing time, device power, and the like. A device capable of more efficiently displaying two images is therefore desirable.

SUMMARY

Various aspects of the present disclosure is to provide a method and apparatus for processing images that can display, when a second image is received during display of a first image, the first image and the second image in an alternating manner to thereby reduce the storage space and image processing time.

In accordance with an aspect of the present disclosure, an electronic device for processing images is provided. The electronic device may include: a display module to display a first image and a control module to control a process of receiving a second image different from the first image. The control module may be capable of altering the second image in accordance with a block area arranged on the first image, determining an output sequence for the first image and the altered second image, and alternatingly displaying the first image and the altered second image according to an output sequence.

In accordance with another aspect of the present disclosure, a method for processing images in an electronic device is provided. The method may include: displaying a first image on a display module, receiving a second image different from the first image, altering the second image in accordance with a block area arranged on the first image, determining an output sequence for the first image and the altered second image and alternatingly displaying the first image and the altered second image according to the output sequence.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 5A, FIG. 5B and FIG. 5C illustrate processing of first and second images according to various embodiments;

FIG. 6A and FIG. 6B are an illustration of displaying two images in an alternating fashion with a given output sequence according to various embodiments;

FIG. 7 is another illustration of displaying two images in an alternating fashion with a given output sequence according to various embodiments;

DETAILED DESCRIPTION

Figure 1:
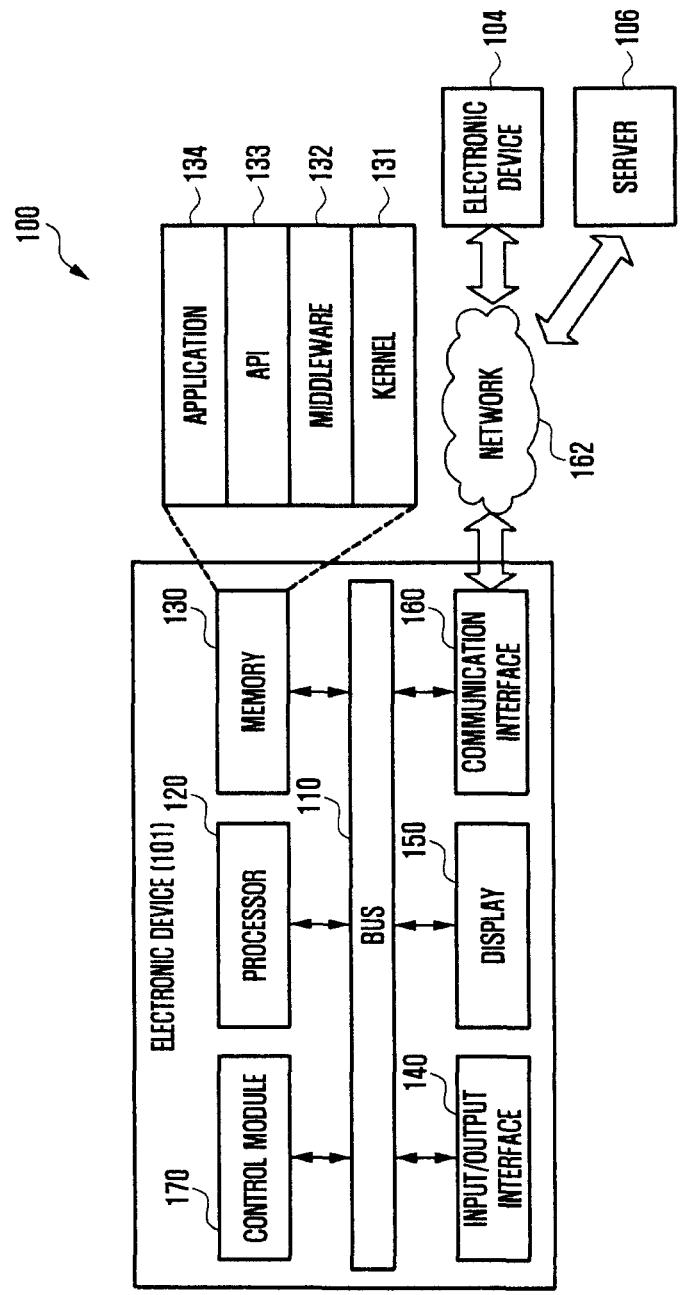
FIG. 1 illustrates a network environment containing electronic devices according to various embodiments.

Hereinafter, the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "and/or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

As used herein, a "block area" may comprise an area within a first image that is designated for display of a second image. Thus, a block area within a first image may be cleared of image data associated with the first image and filled with image data associated with the second image.

In this disclosure, an electronic device may be any device that performs a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, electronic tattoos, an electronic accessory, or a smart watch).

According to some embodiments, an electronic device may be a smart home appliance that performs a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, robot, an automatic teller machine of financial institutions, or point of sales of stores.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. Further, the electronic device according to the present disclosure may be a flexible device. It is noted that the above-mentioned electronic devices are exemplary only and not to be considered as a limitation of this disclosure.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 is a block diagram illustrating a network environment 100 including therein an electronic device 101 in accordance with an embodiment of the present disclosure. The electronic device 101 may include a bus 110, a processor 120, a tangible, non-transitory, computer readable medium or memory 130, an input/output interface 140, a display 150, a communication interface 160, and an application control module 170.

The bus 110 may be a circuit designed for connecting the above-discussed elements and communicating data (e.g., a control message) between such elements.

The processor 120 may receive commands from the other elements (e.g., the memory 130, the input/output interface 140, the display 150, the communication interface 160, or the application control module 170, etc.) through the bus 110, interpret the received commands, and perform arithmetic or data processing based on the interpreted commands.

The memory 130 may store therein commands or data received from or created by the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133, which is an interface for allowing the application 134 to control a function provided by the kernel 131 or the middleware 132, may include, for example, at least one interface or function (e.g., a command) for a file control, a window control, an image processing, a text control, and the like.

According to various embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. The application 134 may be an application associated with an exchange of information between the electronic device 101 and any external electronic device (e.g., an external electronic device 104). This type application may include a notification relay application for delivering specific information to an external electronic device or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). The notification relay application may receive notification information from an external electronic device and offer it to a user. The device management application may manage (e.g., install, remove or update) a certain function (a turn-on/turn-off of an external electronic device (or some components thereof), or an adjustment of brightness (or resolution) of a display) of any external electronic device communicating with the electronic device 101, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various types of information (e.g., multimedia data, text data, etc.) to a user.

The communication interface 160 may perform a communication between the electronic device 101 and any external electronic device (e.g., the electronic device 104 of the server 106). For example, the communication interface 160 may communicate with any external device by being connected with a network 162 through wired or wireless communication. Wireless communication may include at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). Wired communication may include at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160. In addition to a first image displayed on the display module (e.g. display 150), the control module 170 may receive a second image different from the first image. The control module 170 may receive the second image from a camera module installed in the electronic device 101 or from an external device through the communication module. The camera module may be installed on the side of the electronic device 101 opposite the display module. The control module 170 may alter the second image so that the second image fits a block area of the first image. The control module 170 may determine the size and/or position of the block area according to at least one of setting values stored in the electronic device 101, user input values, and the distance to the eye. The control module 170 may change at least one of the size, position, ratio, magnification and resolution of the second image in accordance with the block area.

In the event that the electronic device 101 is a head-mounted device (HMD) including left and right lenses, the control module 170 may divide the first image into a first left image and a first right image, determine the size or position of a block area, and arrange the block area on at least one of the first left image and the first right image. The control module 170 may alter the second image to a second left image or a second right image according to the arranged block area.

The control module 170 may determine the output sequence of the first image and the altered second image. For example, the control module 170 may determine the number of frames to be output for the first image and the altered second image and determine the output sequence on the basis of the determined frame number. The control module 170 may control an operation to alternatingly display the first image and the altered second image on the basis of the output sequence. The control module 170 may control the alternating display of the first image and the altered second image on the basis of a duty cycle and the output sequence. The control module 170 may adjust the duty cycle according to the recognition rate of the user, and control the alternating display of the first image and the altered second image on the basis of the adjusted duty cycle and the output sequence.

Figure 2:
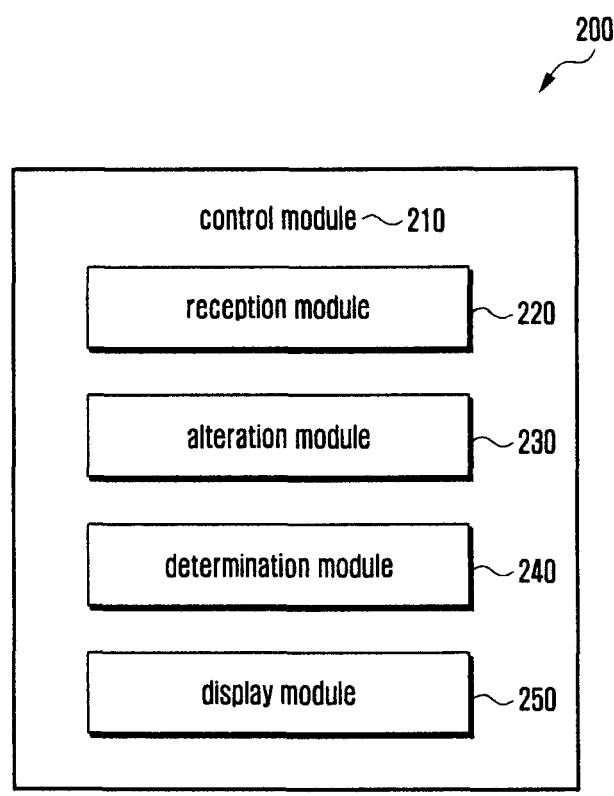
FIG. 2 is a block diagram of an electronic device according to various embodiments.

FIG. 2 is a block diagram of an electronic device 200 according to various embodiments.

Referring to FIG. 2, the electronic device 200 (e.g. electronic device 101) may include a control module 210, a reception module 220, an alteration module 230, a determination module 240, and a display module 250. The control module 210 may control the reception module 220, the alteration module 230, the determination module 240, and the display module 250.

The display module 250 may display a first image. The display module 250 may correspond to the input/output interface 140 or the display 150 of FIG. 1 or may be a touchscreen formed by integrally combining the input/output interface 140 and display 150. The first image may be a still image or a moving image. Thus, as used herein, an image may comprise a plurality of image frames displayed in sequence to form a moving image and/or a single (still) image.

The reception module 220 may receive a second image different from the first image. Like the first image, the second image may be a still image or a moving image. The reception module 220 may receive the second image from a camera module installed in the electronic device 200. The camera module may be installed on the side of the electronic device 200 opposite the display module 250. Alternatively, the reception module 220 may correspond to the communication interface 160 of FIG. 1. In this case, the reception module 220 may receive the second image from an external device being present outside the electronic device 200. That is, the reception module 220 may receive the second image from an entity inside (e.g. camera module) or outside the electronic device 200.

Thus, the electronic device 200 may output one or more first image frames and one or more second image frames in an output sequence. Frames may be output at a rate sufficient to ensure that a user of the electronic device continues to observe (e.g., as part of an afterimage effect) the first or second image during an image output interval for the other image. For instance, a when one or more frames associated with the first image are displayed (and no frames associated with the second image are displayed), the user may nonetheless "see," due to an afterimage effect, the second image superimposed on the first image. Similarly, where the second image is displayed, and the first image is not, the user may "see" the first image superimposed on the second image. The electronic device may thus conserve processing resources (as frames associated with only one image are presented during an image output interval), device power, and device memory.

The reception module 220 may connect to a network through wired or wireless communication and communicate with an external device. Here, wireless communication may be achieved through Wi-Fi, Bluetooth, Near Field Communication (NFC), Global Positioning System (GPS), and/or cellular communication (e.g. LTE, LTE-A, CDMA, WCDMA, UMTS, WiBro or GSM). Wired communication may be achieved through Universal Serial Bus (USB), High Definition Multimedia Interface (HDMI), RS-232 (Recommended Standard 232), and/or Plain Old Telephone Service (POTS).

The alteration module 230 may alter the second image in accordance with a given block area of the first image. The size or position of the block area may be determined according to at least one of setting values stored in the electronic device 200, user input values, and the distance to the eye. The block area may be empty or be filled with a black color for easy recognition of the user. The setting values may be given in advance so as to display the second image well without damage to the user's eyes. The user input values may be given directly by the user to determine the size or position of the block area. When the electronic device 200 is a head-mounted device, the distance to the eye indicates the distance between the lens of the head-mounted device and the user's eyes. Here, the lens may correspond to the display module 250. For example, the electronic device 200 may obtain sensing data using a sensor module and compute the distance between the lens of the head-mounted device and the user's eyes on the basis of the sensing data.

Figure 9:
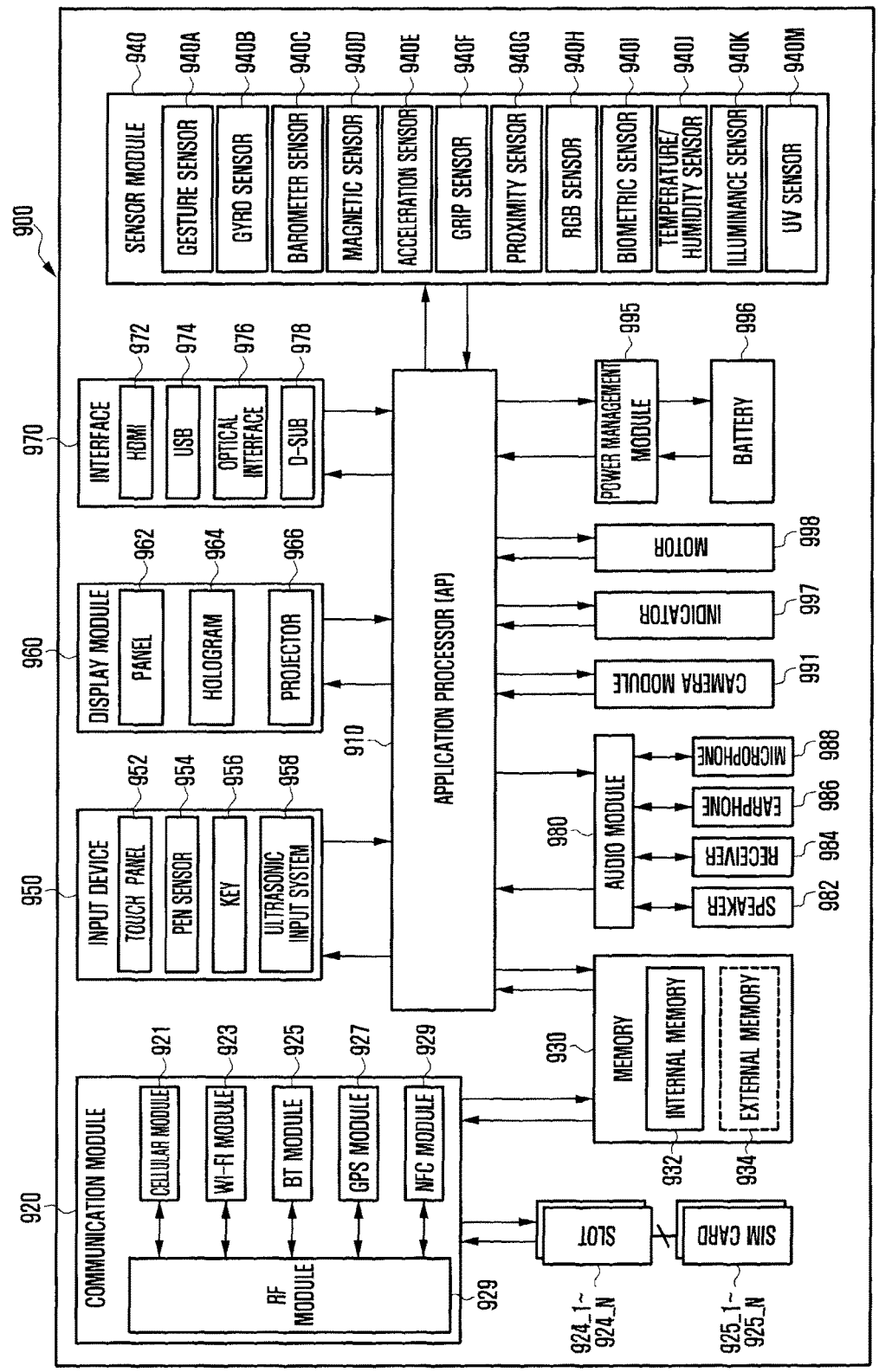
FIG. 9 is a block diagram of an electronic device according to various other embodiments.

The sensor module may measure physical quantities or sense the operating status of the electronic device 200 and convert the measured or sensed information into an electrical signal. The sensor module, as shown in FIG. 9, may include at least one of a gesture sensor, a gyro sensor, an atmospheric pressure sensor, a magnetic sensor, an acceleration sensor, a grip sensor, a proximity sensor, a RGB (red, green, blue) color sensor, a biometric sensor, a temperature/humidity sensor, an illumination sensor, and a ultraviolet (UV) sensor. In addition to or in place of the above sensors, the sensor module may include an E-nose sensor, an electromyography (EMG) sensor, an electroencephalogram (EEG) sensor, an electrocardiogram (ECG) sensor, an infrared (IR) sensor, an iris sensor, and a fingerprint or fingerscan sensor. The sensor module may further include a control circuit for controlling one or more of the sensors equipped therein.

The alteration module 230 may alter at least one of the size, position, ratio, magnification and resolution of the second image in accordance with the given block area. The alteration module 230 may alter the second image according to the block area so as to alternately display the first image and the second image without simultaneous displaying thereof. When the two images have the same size, position, ratio, magnification and resolution, alternating display of the two images may aggravate eye fatigue and lengthen the image processing time. Hence, the alteration module 230 may alter at least one of the size, position, ratio, magnification and resolution of the second image according to the given block area so that the first image and second image are displayed in a better condition.

The determination module 240 may determine an output sequence of the first image and the altered second image. Here, the output sequence may be a display sequence in which the first image is displayed first and then the second image is displayed next. Alternatively, the output sequence may be a time sequence in which the first image is displayed first for a first time and then the second image is displayed next for a second time. To display an image, the number of frames per second may be determined according to the electronic device or user settings. The determination module 240 may determine the number of successive frames to be successively output at one time for the first image or for the altered second image and determine the output sequence on the basis of the determined number of successive frames. The display time may be determined according to the number of successive frames to be output at one time. For example, the first image and the altered second image may be alternately output for each frame, or the first image may be output for two successive frames, and the altered second image may be output for next two successive frames. In other words, the determination module 240 may determine the number of successive frames to be output at one time on the basis of at least one of the size of the block area, the position of the block area, the ratio of the first image, the magnification of the first image, the resolution of the first image, the ratio of the second image, the magnification of the second image, and the resolution of the second image.

The display module 250 may alternately display the first image and the altered second image according to the output sequence. The control module 210 may control the display module 250 to alternately display the first image and the altered second image on the basis of a duty cycle and the output sequence. A video signal output by the electronic device 200 may cause flickering owing to the duty cycle. To prevent the flickering, the control module 210 may adjust the duty cycle. In various embodiments, the control module 210 may adjust the duty cycle according to the recognition rate of the user and control the alternating display of the first image and the altered second image on the basis of the adjusted duty cycle and the output sequence.

The electronic device 200 alternately displaying different images may provide the user with an effect in which the different images are simultaneously displayed on the screen by use of the afterimage phenomenon. The electronic device 200 may reduce power consumption by displaying one image in a full-screen format and displaying the other image in a partial region within the full formatted screen. The electronic device 200 may reduce a storage space or processing time needed for image synthesis by alternately displaying different images instead of combining different images together. In addition, the electronic device 200 enables the user to view both an internally obtained image and an image obtained from the outside on the same screen.

In various embodiments, the electronic device 200 may be a wearable device. Wearable devices may include wrist-attached devices such as a wristwatch and bracelet, and head-mounted devices such as glasses and head-mounted display. When the electronic device 200 is a head-mounted display, the control module 210 may classify images to be displayed into left images and right images in consideration of display characteristics of the head-mounted display.

Figure 3:
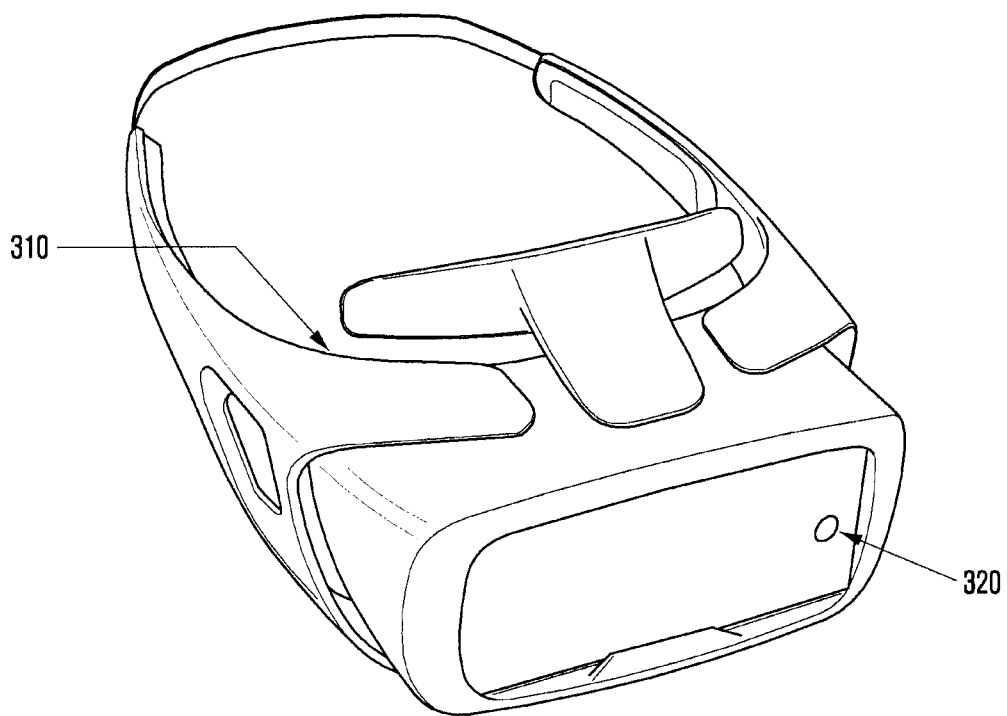
FIG. 3 is an illustration of an electronic device according to various embodiments.

FIG. 3 is an illustration of an electronic device according to various embodiments.

Referring to FIG. 3, when the electronic device is a head-mounted display, the electronic device may classify images to be displayed into left images and right images in consideration of display characteristics. When the electronic device is worn by the user, it may display a first image on a display module 310 and receive a second image from a camera module or external device (not shown) indicated by element 320. The display region of the display module 310 may be composed of a left display region corresponding to the left eye of the user and a right display region corresponding to the right eye of the user. The electronic device may divide the first image into a first left image and a first right image, determine the size or position of a block area, and arrange the block area on at least one of the first left image and the first right image. The electronic device may alter the second image to a second left image or second right image according to the arranged block area. The electronic device may determine an output sequence of the first left image, the first right image, the second left image, and second right image, and alternately display the first left and right images and the second left and right images.

According to various embodiments, an electronic device for processing images display may include: a display module to display a first image and a control module to control a process of receiving a second image different from the first image. The electronic device may alter the second image in accordance with a block area arranged on the first image, determine an output sequence for the first image and the altered second image, and/or alternatingly display the first image and the altered second image according to the output sequence.

The electronic device may further include a camera module and a communication module. The control module may receive the second image from the camera module or from an external device through the communication module.

The camera module may be installed on the side of the electronic device opposite the display module.

The control module may determine the size or position of the block area according to at least one of setting values stored in the electronic device, user input values, and the distance to the eye.

The control module may change at least one of the size, position, ratio, magnification and resolution of the second image in accordance with the block area.

In the event that the electronic device is a head-mounted device including left and right lenses, the control module may divide the first image into a first left image and a first right image, determine the size or position of a block area, and arrange the block area on at least one of the first left image and the first right image.

The control module may divide the second image into a second left image and a second right image and alter the second left image or the second right image according to the block area.

The control module may determine the number of successive frames to be successively output at one time for the first image or for the altered second image, and determine an output sequence on the basis of the determined number of successive frames.

The control module may control the display module to alternately display the first image and the altered second image on the basis of a duty cycle and the output sequence.

The control module may adjust a duty cycle according to the recognition rate of the user, and control the display module to alternatingly display the first image and the altered second image on the basis of the adjusted duty cycle and the output sequence.

Figure 4:
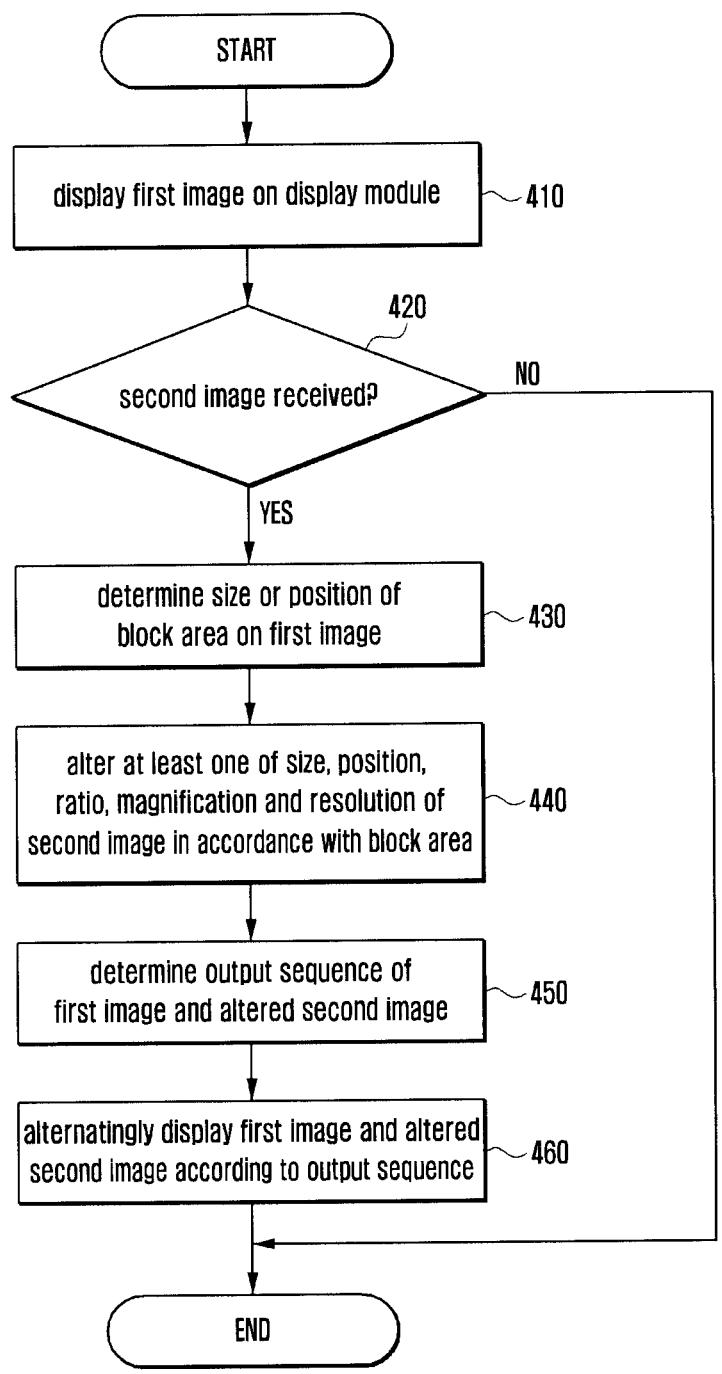
FIG. 4 is a flowchart of an image processing method according to various embodiments.

FIG. 4 is a flowchart of an image processing method according to various embodiments. The image processing method may be executed by the electronic device shown in FIG. 1 or 2.

Referring to FIG. 4, at operation 410, the electronic device displays a first image on a display module. The display module may be used to display various information (e.g. text, image, moving image, data, content, or application) to the user. The area displayed from the display module may be referred to as view port or view area.

At operation 420, the electronic device checks whether a second image is received. The electronic device may receive the second image from a camera module. The camera module may be installed on a side of the electronic device opposite the display module. The electronic device may also receive the second image from an external device through a communication module, the external device being located an outside, but not an inside of the electronic device. That is, the electronic device may receive the second image from the entity inside (e.g. camera module) or the outside the electronic device 200.

If the second image is received, the procedure proceeds to operation 430. If the second image is not received, the procedure ends.

At operation 430, the electronic device determines the size or position of a block area of the first image. The electronic device may determine the size or position of the block area according to at least one of setting values stored in the electronic device, user input values, and the between an eye of the user and the display 150 (or the "distance to the eye"). The setting values may be given in advance so as to display the second image well without damage to the eyes. The user input values may be given directly by the user to determine the size or position of the block area. When the electronic device 200 is a head-mounted device, the distance to the eye indicates the distance between the lens of the head-mounted device and the user's eyes. Here, the lens may correspond to the display module. For example, the electronic device may detect sensing data using a sensor module and compute the distance between the lens of the head-mounted device and the user's eyes on the basis of the detected sensing data.

At operation 440, the electronic device alters at least one of the size, position, ratio, magnification and resolution of the second image in accordance with the given block area. The electronic device may alter the second image according to the block area so as to alternately/alternatingly display the first image and the second image without simultaneous displaying thereof. The electronic device may alter at least one of the size, position, ratio, magnification and resolution of the second image according to the given block area, so that the first image and second image are displayed in a better condition.

At operation 450, the electronic device determines an output sequence of the first image and the altered second image. Here, the output sequence may be a display sequence in which the first image is displayed first and then the second image is displayed next. Alternatively, the output sequence may be a time sequence in which the first image is displayed first for a first time and then the second image is displayed next for a second time. In general, in case of displaying an image, the number of the frames for the image displayed per second may be determined according to the electronic device or user settings. The electronic device may determine the number of successive frames to be successively output at one time for the first image or for the altered second image, and determine the output sequence on the basis of the determined number of successive frames. The display time may be determined according to the number of successive frames to be output at one time. For example, the first image and the altered second image may be alternately/alternatingly output for each frame, or the first image may be output for two successive frames and the altered second image may be output for next two successive frames. The electronic device may determine the number of successive frames to be output at one time differently for the first image and the second image. For example, the number of successive frames to be output at one time may be determined so that the first image is output for two successive frames and the altered second image is output for one frame.

In other words, the electronic device may determine the number of successive frames to be output at one time on the basis of at least one of the size of the block area, the position of the block area, the ratio of the first image, the magnification of the first image, the resolution of the first image, the ratio of the second image, the magnification of the second image, and the resolution of the second image.

Thus, the electronic device may output frames associated with the first and second images in an alternating pattern. A variety of output patterns is described below with respect to FIGS. 6A-8B.

At operation 460, the electronic device alternately/alternatingly displays the first image and the altered second image according to the output sequence. The electronic device may control the display module to alternately/alternatingly display the first image and the altered second image on the basis of a duty cycle and an output sequence. The electronic device may adjust the duty cycle so as to prevent screen flickering. In various embodiments, the electronic device may adjust the duty cycle according to the recognition rate of the user and control the display module to alternately/alternatingly display of the first image and the altered second image on the basis of the adjusted duty cycle and the output sequence.

In various embodiments, when the electronic device is a head-mounted display, the electronic device may classify images to be displayed into left images and right images in consideration of display characteristics. The electronic device may divide the first image into a first left image and a first right image, determine the size or position of a block area, and arrange the block area on at least one of the first left image and the first right image. That is, the electronic device may arrange the block area on one or both of the first left image and the first right image. The electronic device may divide the second image into a second left image and a second right image, and alter the second left image or second right image according to the arranged block area. For example, the electronic device may alter at least one of the size, position, ratio, magnification and resolution of the second left image and/or the second right image according to the arranged block area.

According to various embodiments, an image processing method for an electronic device may include: displaying a first image on a display module; receiving a second image different from the first image; altering the second image in accordance with a block area arranged on the first image; determining an output sequence for the first image and the altered second image; and alternately/alternatingly displaying the first image and the altered second image according to the output sequence.

The second image may be obtained by receiving the second image from a camera module installed in the electronic device or from an external device.

Also, the second image may be obtained by receiving the second image from the camera module installed on the side of the electronic device opposite the display module.

The method may further include determining the size or position of the block area according to at least one of setting values stored in the electronic device, user input values, and the distance to the eye.

The second image may be obtained by altering at least one of the size, position, ratio, magnification and resolution of the second image according to the block area.

In the event that the electronic device is a head-mounted device including left and right lenses, the method may further include: dividing the first image into a first left image and a first right image, determining the size or position of the block area, and arranging the block area on at least one of the first left image and the first right image.

The second image may be obtained by dividing the second image into a second left image and a second right image and changing one of the second left image and the second right image according to the block area.

The output sequence may be obtained by determining the number of successive frames to be output at one time for the first image or for the altered second image and determining the output sequence on the basis of the determined number of successive frames.

The first image and the altered second image may be obtained by alternately/alternatingly displaying the first image and the altered second image on the basis of a duty cycle and the output sequence.

Figure 5C:
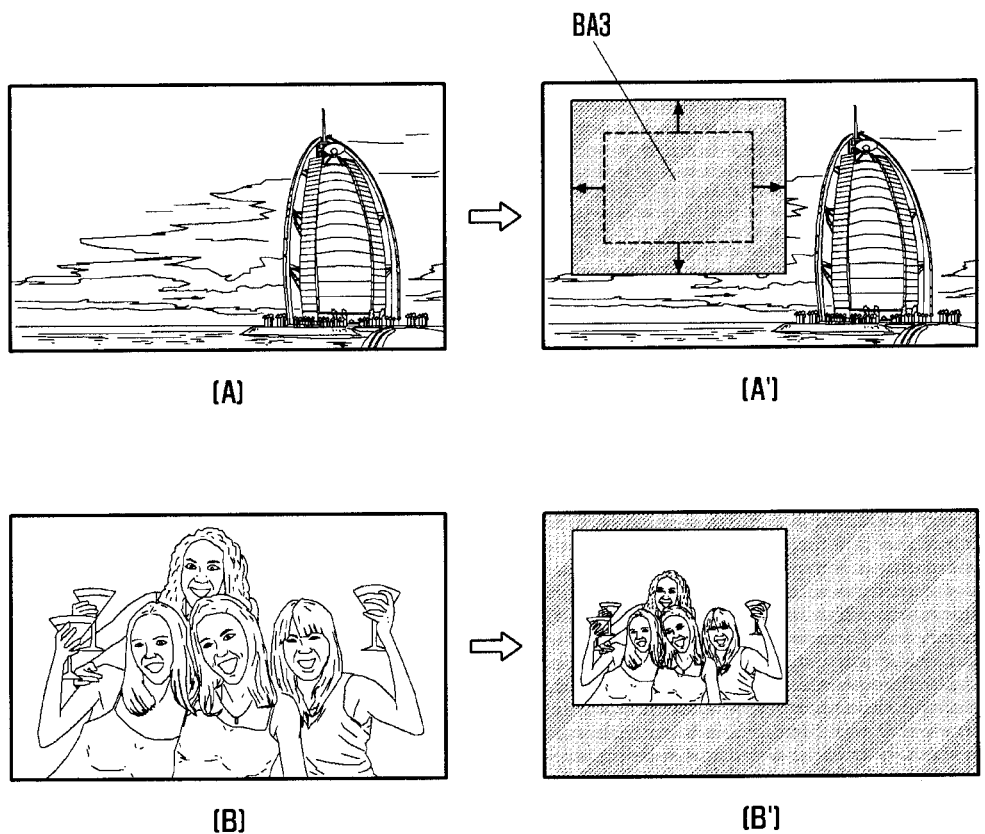

Further, the first image and the altered second image may be obtained by adjusting the duty cycle according to the recognition rate of the user and alternating display of the first image and the altered second image on the basis of the adjusted duty cycle and the output sequence. FIGS. 5A to 5C illustrate processing of first and second images according to various embodiments.

Referring now to FIG. 5A, indicia A indicates the first image and indicia B indicates the second image. The electronic device may arrange a block area BA1 on the first image as indicated by indicia A'. That is, indicia A indicates the original version of the first image and indicia A' indicates a newly created version of the first image. The electronic device may determine the size or position of the block area BA1 according to at least one of stored setting values, user input values, and the distance to the eye. The block area BA1 of the first image may be emptied. The electronic device may receive a second image indicated by indicia B different from the first image indicated by indicia A and alter the second image in accordance with the block area BA1 arranged on the first image. For example, the second image indicated by indicia B' may be a version of the second image indicated by indicia B obtained by changing at least one of the size, position, ratio, magnification and resolution thereof in accordance with the block area BA1. That is, indicia B indicates the original version of the second image and indicia B' indicates a newly changed version of the second image. In FIG. 5A, the second image indicated by indicia B is reduced in size so that it fits the size of the block area BA1 as indicated by indicia B'.

Thus, in various embodiments, a block area in the first image may be designated and cleared of image data, and the second image may be formatted (e.g., in size, position, ration, magnification, and/or resolution) for display within the designated block area. Having formatted each of the first and second images, the electronic device 200 may display one or the other image in an alternating pattern at a frame rate that is sufficiently rapid to introduce an afterimage effect, whereby a user of the electronic device is unable to visually determine which of the second or first images is being displayed.

Referring to FIG. 5B, on the first image indicated by indicia A, the electronic device may arrange a block area BA2 as indicated by indicia A'. The electronic device may alter the second image indicated by indicia B in accordance with the block area BA2 arranged on the first image. The second image indicated by indicia B' may be a version of the second image indicated by indicia B obtained by changing the size and position thereof in accordance with the block area BA2. That is, indicia B indicates the original version of the second image and indicia B' indicates a newly changed version of the second image. To compare FIG. 5B with FIG. 5A, the block area BA2 of FIG. 5B and the block area BA1 of FIG. 5A are different in terms of position. Accordingly, the second image may, as shown, be displayed within a variety of locations.

Referring to FIG. 5C, on the first image indicated by indicia A, the electronic device may arrange a block area BA3 as indicated by indicia A'. The electronic device may alter the second image indicated by indicia B in accordance with the block area BA3 arranged on the first image. The second image indicated by indicia B' may be a version of the second image indicated by indicia B obtained by altering the size and position thereof in accordance with the block area BA3. That is, indicia B indicates the original version of the second image and indicia B' indicates a newly altered version of the second image. To compare FIG. 5C with FIG. 5A, the block area BA3 of FIG. 5C is greater than the block area BA1 of FIG. 5A.

Figure 6A:
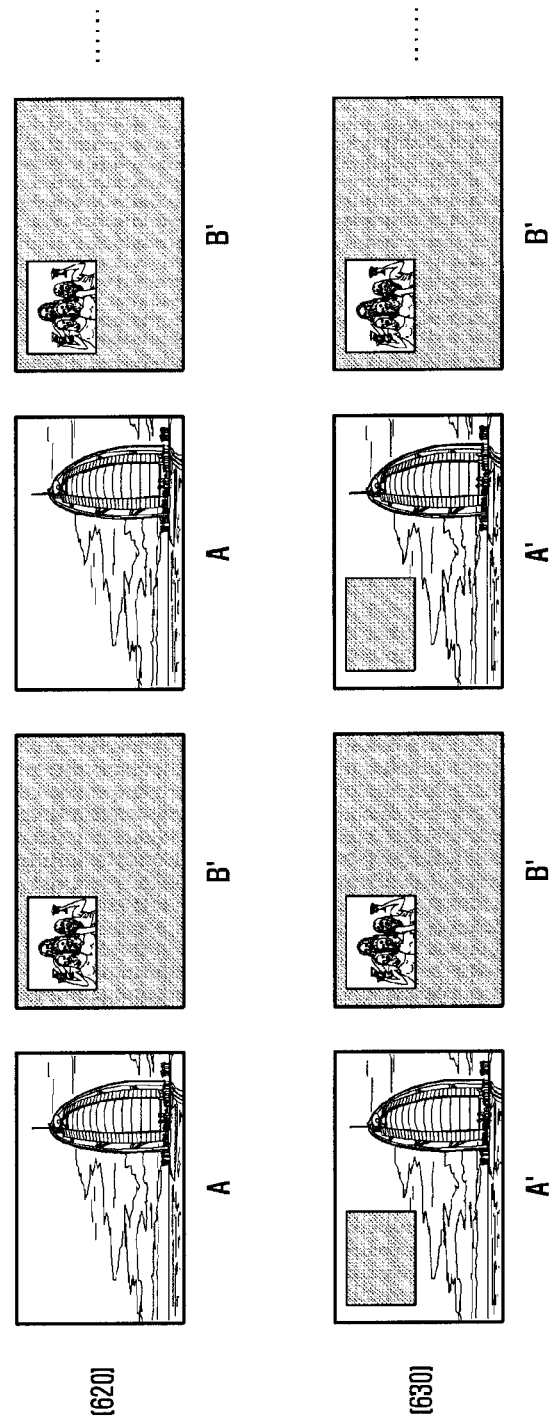

FIGS. 6A and 6B are an illustration of displaying two images in an alternating fashion with a given output sequence according to various embodiments.

Referring to FIG. 6A, the electronic device may use an alternating output sequence in which a first image (A) is displayed first and then a second image (B) is displayed as indicated by indicia 610. The electronic device may determine the number of successive frames to be output at one time for the first image or for the altered second image, and determine the output sequence on the basis of the determined number of successive frames. For example, as indicated by indicia 610, the number of successive frames to be output at one time may be set to 1, so that the first image (A) and the second image (B) are alternately/alternatingly output for each frame.

For example, as indicated by indicia 620, for each frame, the electronic device may alternately/alternatingly display the original version of the first image (A) and a version of the second image (B') altered according to the block area of the first image. In addition, as indicated by indicia 630, for each frame, the electronic device may alternately/alternatingly display a version of the first image (A') containing a block area and a version of the second image (B') altered according to the block area of the first image.

Referring to FIG. 6B, the electronic device may use an output sequence in which a first image (A) is displayed first, a second image (B) is displayed next, and then an empty image (E) is displayed before new display of the first image as indicated by indicia 640. For example, as indicated by indicia 650, the electronic device may display the original version of the first image (A) as the first frame, a version of the second image (B') altered according to the block area of the first image as the second frame, and the empty image (E) as the third frame. Thereafter, the original version of the first image (A) is displayed as the fourth frame, the version of the second image (B') altered according to the block area of the first image is displayed as the fifth frame, and so on.

In addition, as indicated by indicia 650, the electronic device may display a version of the first image (A') containing a block area as the first frame, a version of the second image (B') altered according to the block area of the first image as the second frame, and an empty image (E) as the third frame. The electronic device may display the empty image (E) so that the first image (A) and the second image (B') do not overlap. Inserting the empty image may, in addition, save power (as fewer images are displayed during a given time period).

FIG. 7 is another illustration of displaying two images in an alternating fashion with a given output sequence according to various embodiments.

As shown with reference to FIG. 7, the electronic device may use an output sequence in which a first image (A) is displayed first for 2 frames and then a second image (B) is displayed for 2 frames as indicated by indicia 710. The electronic device may set the number of successive frames to be output at one time for the first image or for the altered second image to 2, and determine the output sequence on the basis of the determined number of successive frames. For example, as indicated by indicia 710, the number of successive frames to be output at one time may be set to 2, so that the first image (A) is output first for two frames and then the second image (B) is output for the next two frames.

For example, as indicated by indicia 720, the electronic device may display the original version of the first image (A) as the first and second frames, and a version of the second image (B') altered according to the block area of the first image as the third and fourth frames. In addition, as indicated by indicia 730, the electronic device may display a version of the first image (A') containing a block area as the first and second frames, and a version of the second image (B') altered according to the block area of the first image as the third and fourth frames.

In various embodiments, the electronic device may adjust the duty cycle so as to prevent screen flickering. The electronic device may adjust a duty cycle according to the recognition rate of the user, and control the alternating display of the first image and the altered second image on the basis of the adjusted duty cycle and the output sequence.

Figure 8A:
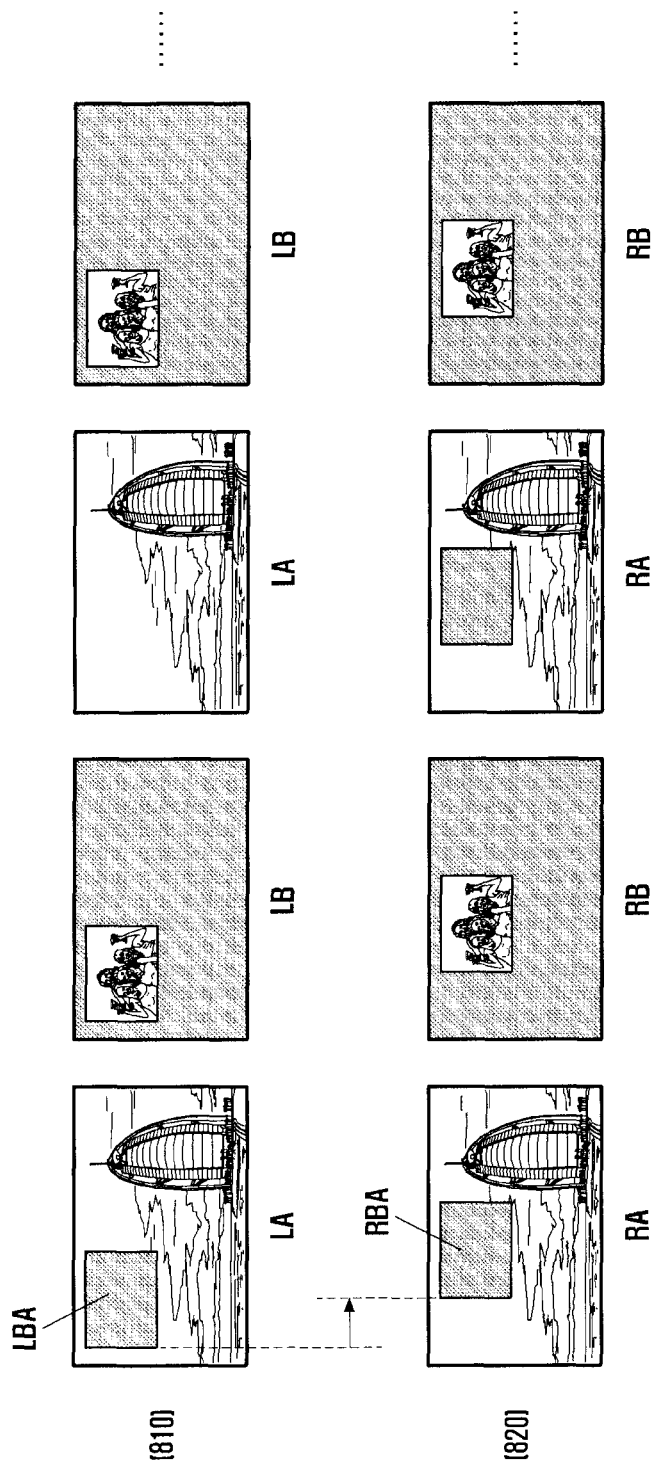
FIG. 8A and FIG. 8B illustrate processing of left and right images according to various embodiments.
Figure 8B:
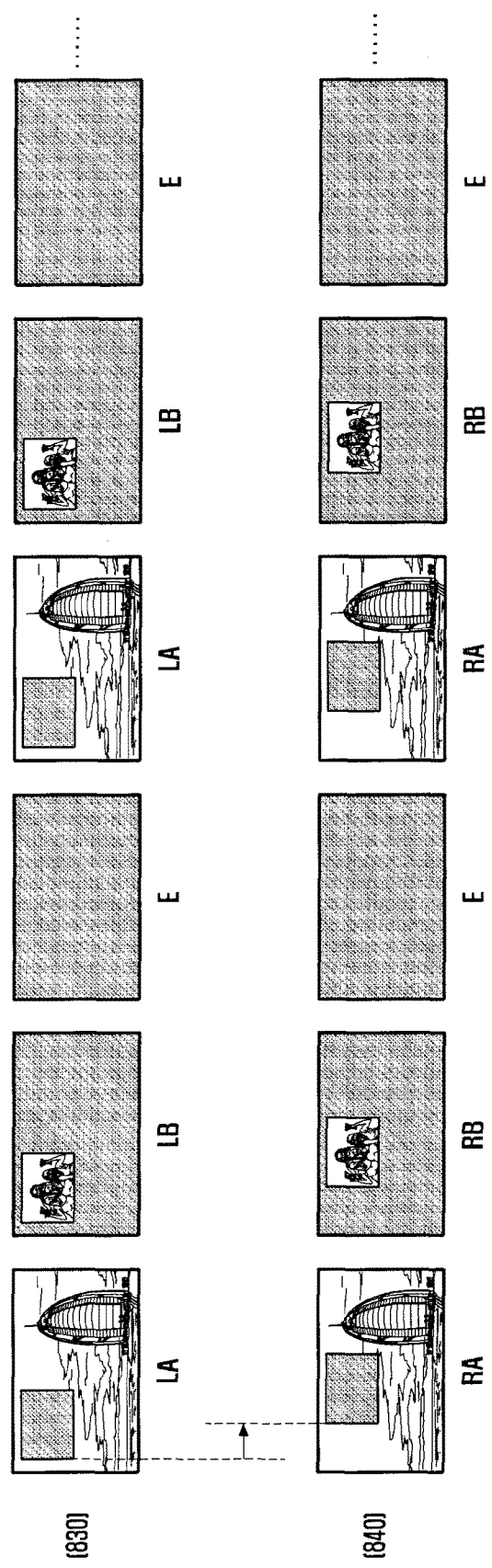

FIGS. 8A and 8B illustrate processing of left and right images according to various embodiments.

Referring to FIG. 8A, when the electronic device is a head-mounted display, to display one image in each of the left display region and the right display region, the electronic device may divide individual images into left images as indicated by indicia 810 and right images as indicated by indicia 820. In the case of the first frame, the electronic device may divide the first image (A) into a first left image LA and a first right image RA. The electronic device may determine the size or position of a block area and arrange the block area on at least one of the first left image LA and the first right image RA. In FIG. 8A, block areas may be classified into left block areas arranged on left images and right block areas arranged on right images; indicia LBA indicates a left block area and indicia RBA indicates a right block area.

For example, the electronic device may arrange a block area on one or both of the first left image LA and the first right image RA. In the case of the second frame, the electronic device may divide the second image (B) into a second left image LB and a second right image RB. The electronic device may alter the second left image LB or the second right image RB according to the arranged block area.

As indicated by indicia 810, the electronic device may use an alternating output sequence in which the first left image LA is displayed first and then the second left image LB is displayed. In addition, as indicated by indicia 820, the electronic device may use an alternating output sequence in which the first right image RA is displayed first and then the second right image RB is displayed. As shown in FIG. 8A, the block area LBA of the left image and the block area RBA of the right image may differ in terms of position and/or size.

Referring to FIG. 8B, as indicated by indicia 830, the electronic device may use an output sequence in which the first left image LA is displayed first, the second left image LB is displayed next, and then an empty image (E) is displayed before new display of the first left image. In addition, as indicated by indicia 840, the electronic device may use an output sequence in which the first right image RA is displayed first, the second right image RB is displayed next, and then the empty image (E) is displayed before new display of the first right image. As shown in FIG. 8B, the block area LBA of the left image and the block area RBA of the right image may differ in terms of position or size.

FIG. 9 is a block diagram illustrating an electronic device 900 in accordance with an embodiment of the present disclosure. The electronic device 900 may form, for example, the whole or part of the electronic device 101 shown in FIG. 1. Electronic device 900 may include at least one application processor (AP) 910, a communication module 920, a subscriber identification module (SIM) card 924, a memory 930, a sensor module 940, an input unit 950, a display 960, an interface 970, an audio module 980, a camera module 991, a power management module 995, a battery 996, an indicator 997, and a motor 998.

The AP 910 may drive an operating system or applications, control a plurality of hardware or software components connected thereto, and also perform processing and operation for various data including multimedia data. The AP 910 may be formed of system-on-chip (SoC), for example. According to an embodiment, the AP 910 may further include a graphic processing unit (GPU).

The communication module 920 (e.g., the communication interface 160) may perform data communication with any other electronic device (e.g., the electronic device 104 or the server 106) connected to the electronic device 900 (e.g., the electronic device 101) through the network. According to an embodiment, the communication module 920 may include therein a cellular module 921, a WiFi module 923, a BT module 925, a GPS module 927, an NFC module 928, and/or an RF (Radio Frequency) module 929.

The cellular module 921 may support a voice call, a video call, a message service, an internet service, or the like through a communication network (e.g., LTE, LTE-A, CDMA, WCDMA, UMTS, WiBro, or GSM, etc.). Additionally, the cellular module 921 may perform identification and authentication of the electronic device in the communication network, using the SIM card 924. According to an embodiment, the cellular module 921 may perform at least part of functions the AP 910 can provide. For example, the cellular module 921 may perform at least part of a multimedia control function.

According to an embodiment, the cellular module 921 may include a communication processor (CP). Additionally, the cellular module 921 may be formed of SoC, for example. Although some elements such as the cellular module 921 (e.g., the CP), the memory 930, or the power management module 995 are shown as separate elements being different from the AP 910 in FIG. 9, the AP 910 may be formed to have at least part (e.g., the cellular module 921) of the above elements in an embodiment.

According to an embodiment, the AP 910 or the cellular module 921 (e.g., the CP) may load commands or data, received from a nonvolatile memory connected thereto or from at least one of the other elements, into a volatile memory to process them. Additionally, the AP 910 or the cellular module 921 may store data, received from or created at one or more of the other elements, in the nonvolatile memory.

Each of the WiFi module 923, the BT module 925, the GPS module 927 and the NFC module 928 may include a processor for processing data transmitted or received therethrough. Although FIG. 9 shows the cellular module 921, the WiFi module 923, the BT module 925, the GPS module 927 and the NFC module 928 as different blocks, at least part of them may be contained in a single IC (Integrated Circuit) chip or a single IC package in an embodiment. For example, at least part (e.g., the CP corresponding to the cellular module 921 and a WiFi processor corresponding to the WiFi module 923) of respective processors corresponding to the cellular module 921, the WiFi module 923, the BT module 925, the GPS module 927 and the NFC module 928 may be formed as a single SoC.

The RF module 929 may transmit and receive data, e.g., RF signals or any other electric signals. Although not shown, the RF module 929 may include a transceiver, a PAM (Power Amp Module), a frequency filter, an LNA (Low Noise Amplifier), or the like. Also, the RF module 929 may include any component, e.g., a wire or a conductor, for transmission of electromagnetic waves in a free air space. Although FIG. 9 shows that the cellular module 921, the WiFi module 923, the BT module 925, the GPS module 927 and the NFC module 928 share the RF module 929, at least one of them may perform transmission and reception of RF signals through a separate RF module in an embodiment.

The SIM card 924_1 to 924_N may be a specific card including a subscriber identity module (SIM) and may be inserted into a slot 925_1 to 925_N formed at a certain place of the electronic device. The SIM card 924_1 to 924_N may contain therein an ICCID (Integrated Circuit Card IDentifier) or an IMSI (International Mobile Subscriber Identity).

The memory 930 (e.g., the memory 130) may include an internal memory 932 and an external memory 934. The internal memory 932 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 932 may have the form of an SSD (Solid State Drive). The external memory 934 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 934 may be functionally connected to the electronic device 900 through various interfaces. According to an embodiment, the electronic device 900 may further include a storage device or medium such as a hard drive.

The sensor module 940 may measure physical quantity or sense an operating status of the electronic device 900, and then convert measured or sensed information into electrical signals. The sensor module 940 may include, for example, at least one of a gesture sensor 940A, a gyro sensor 940B, an atmospheric sensor 940C, a magnetic sensor 940D, an acceleration sensor 940E, a grip sensor 940F, a proximity sensor 940G, a color sensor 940H (e.g., RGB (Red, Green, Blue) sensor), a biometric sensor 940I, a temperature-humidity sensor 940J, an illumination sensor 940K, and a UV (ultraviolet) sensor 940M. Additionally or alternatively, the sensor module 940 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 940 may include a control circuit for controlling one or more sensors equipped therein.

The input unit 950 may include a touch panel 952, a digital pen sensor 954, a key 956, and/or an ultrasonic input unit 958. The touch panel 952 may recognize a touch input in a manner of capacitive type, resistive type, infrared type, or ultrasonic type. Also, the touch panel 952 may further include a control circuit. In case of a capacitive type, a physical contact or proximity may be recognized. The touch panel 952 may further include a tactile layer. In this case, the touch panel 952 may offer a tactile feedback to a user.

The digital pen sensor 954 may be formed in the same or similar manner as receiving a touch input or by using a separate recognition sheet. The key 956 may include, for example, a physical button, an optical key, or a keypad. The ultrasonic input unit 958 is a specific device capable of identifying data by sensing sound waves with a microphone 988 in the electronic device 900 through an input tool that generates ultrasonic signals, thus allowing wireless recognition. According to an embodiment, the electronic device 901 may receive a user input from any external device (e.g., a computer or a server) connected thereto through the communication module 920.

The display 960 (e.g., the display 150) may include a panel 962, a hologram 964, or a projector 966. The panel 962 may be, for example, LCD (Liquid Crystal Display), AM-OLED (Active Matrix Organic Light Emitting Diode), or the like. The panel 962 may have a flexible, transparent or wearable form. The panel 962 may be formed of a single module with the touch panel 952. The hologram 964 may show a stereoscopic image in the air using interference of light. The projector 966 may project an image onto a screen, which may be located at the inside or outside of the electronic device 900. According to an embodiment, the display 960 may further include a control circuit for controlling the panel 962, the hologram 964, and the projector 966.

The interface 970 may include, for example, an HDMI (High-Definition Multimedia Interface) 972, a USB (Universal Serial Bus) 974, an optical interface 976, or a D-sub (D-subminiature) 978. The interface 970 may be contained, for example, in the communication interface 160 shown in FIG. 1. Additionally or alternatively, the interface 970 may include, for example, an MHL (Mobile High-definition Link) interface, an SD (Secure Digital) card/MMC (Multi-Media Card) interface, or an IrDA (Infrared Data Association) interface.

The audio module 980 may perform a conversion between sounds and electrical signals. At least part of the audio module 980 may be contained, for example, in the input/output interface 140 shown in FIG. 1. The audio module 980 may process sound information inputted or outputted through a speaker 982, a receiver 984, an earphone 986, or a microphone 988.

The camera module 991 is a device capable of obtaining still images and moving images. According to an embodiment, the camera module 991 may include at least one image sensor (e.g., a front sensor or a rear sensor), a lens (not shown), an ISP (Image Signal Processor, not shown), or a flash (e.g., LED or xenon lamp, not shown).

The power management module 995 may manage electrical power of the electronic device 900. Although not shown, the power management module 995 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 996 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 996 and a voltage, current or temperature in a charging process. The battery 996 may store or create electrical power therein and supply electrical power to the electronic device 900. The battery 296 may be, for example, a rechargeable battery or a solar battery.

The indicator 997 may show thereon a current status (e.g., a booting status, a message status, or a recharging status) of the electronic device 900 or of its part (e.g., the AP 910). The motor 998 may convert an electrical signal into a mechanical vibration. Although not shown, the electronic device 900 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Accordingly, in summary, in various embodiments, during display of a first image, when a second image is received, the first image and the second image may be displayed in an alternating manner.

In various embodiments, alternately/alternatingly displaying different images may provide the user with an effect in which the different images are simultaneously displayed on the screen by use of the afterimage phenomenon.

In various embodiments, the electronic device may reduce power consumption by displaying one image in a full-screen format and displaying the other image in a region of the screen.

In various embodiments, it is additionally possible to reduce the storage space or processing time needed for image synthesis by alternately displaying different images instead of combining different images together.

In various embodiments, the user may view both an image internally obtained by the electronic device and an image obtained from the outside on the same screen.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

What is claimed is:

1. An electronic device for processing images, the electronic device comprising:
   a display; and
   a controller configured to:
   determine a size and position of a block area of a first image;
   alter a second image to correspond to the size of the block area of the first image;
   determine a duty cycle and an output order associated with alternately displaying the first image and the second image; and
   alternately display the first image containing the block area and the second image on the display according to the duty cycle and the output order,
   wherein the first image is displayed with the block area and the second image is displayed at a position corresponding to the block area of the first image.

2. The electronic device of claim 1, further comprising a camera module and a communication module, wherein the controller receives the second image from the camera module or from an external device through the communication module.

3. The electronic device of claim 2, wherein the camera module is installed on a side of the electronic device opposite the display.

4. The electronic device of claim 1, wherein the controller determines at least one of a size or position of the block area according to at least one of setting values stored in the electronic device, user input values, and a distance between an eye of a user and the display.

5. The electronic device of claim 1, wherein the controller alters at least one of a size, position, ratio, magnification or resolution of the second image in accordance with the block area.

6. The electronic device of claim 1, wherein, when the electronic device is a head-mounted device including left and right lenses, the controller divides the first image into a first left image and a first right image, determines a size or position of the block area, and arranges the block area on at least one of the first left image and the first right image.

7. The electronic device of claim 6, wherein the controller divides the second image into a second left image and a second right image and alters one of the second left image and the second right image according to the block area.

8. The electronic device of claim 1, wherein the controller determines a number of successive frames to be output for the first image and for the altered second image and determines the output order on a basis of the determined number of successive frames.

9. The electronic device of claim 1, wherein the controller adjusts the duty cycle according to a recognition rate of a user, and controls the alternating display of the first image and the altered second image based on the adjusted duty cycle and the output order.

10. A method for processing images in an electronic device, the method comprising:
   determining a size and position of a block area of a first image;
   altering a second image to correspond to the size of the block area of the first image;
   determining a duty cycle and an output order associated with alternately displaying the first image and the second image; and
   alternately displaying the first image containing the block area and the second image according to the duty cycle and the output order,
   wherein the first image is displayed with the block area and the second image is displayed at a position corresponding to the block area of the first image.

11. The method of claim 10, wherein the second image is obtained by receiving the second image from a camera module installed in the electronic device or from an external device.

12. The method of claim 11, wherein the second image is obtained by receiving the second image from the camera module installed on a side of the electronic device opposite a display module.

13. The method of claim 10, further comprising determining at least one of a size or position of the block area according to at least one of setting values stored in the electronic device, user input values, and a distance between an eye of a user and a display module.

14. The method of claim 10, wherein the second image is obtained by changing at least one of a size, position, ratio, magnification or resolution of the second image in accordance with the block area.

15. The method of claim 10, further comprising:
   dividing, when the electronic device is a head-mounted device including left and right lenses, the first image into a first left image and a first right image; and
   determining a size or position of the block area and arranging the block area on at least one of the first left image and the first right image.

16. The method of claim 15, wherein the second image is obtained by:
   dividing the second image into a second left image and a second fight image; and
   altering one of the second left image and the second right image according to the block area.

17. The method of claim 10, wherein the output order is obtained by:
   determining a number of successive frames to be output at one time for the first image or for the altered second image; and
   determining the output order on a basis of the determined number of successive frames.

18. The method of claim 10, wherein the first image and the altered second image are obtained by:
   adjusting the duty cycle according to a recognition rate of a user; and
   alternatingly displaying the first image and the altered second image on a basis of the adjusted duty cycle and the output order.

* * * * *